US008296797B2

(12) United States Patent
Olstad et al.

(10) Patent No.: US 8,296,797 B2
(45) Date of Patent: Oct. 23, 2012

(54) INTELLIGENT VIDEO SUMMARIES IN INFORMATION ACCESS

(75) Inventors: Bjørn Olstad, Stathelle (NO); Will Arentz, Drammen (NO)

(73) Assignee: Microsoft International Holdings B.V., Amsterdam (NL)

( * ) Notice: Subject to any disclaimer, the term of this patent is extended or adjusted under 35 U.S.C. 154(b) by 628 days.

(21) Appl. No.: 11/793,389

(22) PCT Filed: Oct. 18, 2006

(86) PCT No.: PCT/NO2006/000361

§ 371 (c)(1),
(2), (4) Date: Jun. 19, 2007

(87) PCT Pub. No.: WO2007/046708

PCT Pub. Date: Apr. 26, 2007

(65) Prior Publication Data

US 2008/0097970 A1 Apr. 24, 2008

(30) Foreign Application Priority Data

Oct. 19, 2005 (NO) .................................... 20054844

(51) Int. Cl.
*G06F 3/00* (2006.01)
*G06F 13/00* (2006.01)
*H04N 5/445* (2006.01)
*H04N 7/173* (2011.01)

(52) U.S. Cl. ................ 725/41; 725/37; 725/43; 725/53; 725/54; 725/60; 725/61; 725/86

(58) Field of Classification Search .................. 725/120
See application file for complete search history.

(56) References Cited

U.S. PATENT DOCUMENTS

| | | | | |
|---|---|---|---|---|
| 5,900,868 | A * | 5/1999 | Duhault et al. | 725/42 |
| 6,636,238 | B1 * | 10/2003 | Amir et al. | 715/730 |
| 7,149,332 | B2 * | 12/2006 | Bacus et al. | 382/128 |
| 2001/0049826 | A1 * | 12/2001 | Wilf | 725/120 |
| 2002/0038456 | A1 * | 3/2002 | Hansen et al. | 725/46 |
| 2002/0167607 | A1 * | 11/2002 | Eerenberg et al. | 348/439.1 |
| 2003/0140159 | A1 * | 7/2003 | Campbell et al. | 709/231 |
| 2003/0152904 | A1 * | 8/2003 | Doty, Jr. | 434/350 |
| 2004/0045040 | A1 | 3/2004 | Hayward | |
| 2004/0220926 | A1 | 11/2004 | Lamkin et al. | |
| 2005/0071780 | A1 * | 3/2005 | Muller et al. | 715/825 |
| 2005/0169366 | A1 | 8/2005 | Clark | |
| 2005/0198006 | A1 * | 9/2005 | Boicey et al. | 707/2 |
| 2006/0026147 | A1 * | 2/2006 | Cone et al. | 707/3 |
| 2006/0117365 | A1 * | 6/2006 | Ueda et al. | 725/112 |
| 2006/0136982 | A1 * | 6/2006 | Martinolich et al. | 725/135 |
| 2006/0288368 | A1 * | 12/2006 | Huslak et al. | 725/46 |
| 2007/0024705 | A1 * | 2/2007 | Richter et al. | 348/142 |

(Continued)

FOREIGN PATENT DOCUMENTS

EP 1 777 615 A2 4/2007

(Continued)

*Primary Examiner* — Justin Shepard
(74) *Attorney, Agent, or Firm* — Merchant & Gould

(57) ABSTRACT

In a method for displaying video data within result presentations in information access or search systems, compressed thumbnails are computed for videos in a result page and applied to the result page. An end user is enabled to select a video in the result page and activate streaming of a video summary within the context of the associated result page.

22 Claims, 17 Drawing Sheets
(17 of 17 Drawing Sheet(s) Filed in Color)

U.S. PATENT DOCUMENTS

| | | | | |
|---|---|---|---|---|
| 2007/0130203 | A1* | 6/2007 | Gulli et al. | 707/104.1 |
| 2007/0140572 | A1* | 6/2007 | Buckley | 382/233 |
| 2007/0244902 | A1* | 10/2007 | Seide et al. | 707/10 |
| 2007/0283391 | A1* | 12/2007 | Connelly et al. | 725/44 |
| 2008/0066107 | A1* | 3/2008 | Moonka et al. | 725/42 |
| 2008/0141303 | A1* | 6/2008 | Walker et al. | 725/39 |

FOREIGN PATENT DOCUMENTS

| | | | |
|---|---|---|---|
| GB | 2388739 | A | 11/2003 |
| KR | 10-2003-0084648 | A | 11/2003 |
| WO | WO-00/05884 | A1 | 2/2000 |
| WO | WO-02/08948 | A2 | 1/2002 |
| WO | WO-2007/009238 | A1 | 1/2007 |

* cited by examiner

Fig. 4

```
- <PLAY>
    <MAINTITLE>The Tragedy of Antony and Cleopatra</MAINTITLE>
  + <FM>
  + <PERSONAE>
    <SCNDESCR>SCENE In several parts of the Roman empire.</SCNDESCR>
    <PLAYSUBT>ANTONY AND CLEOPATRA</PLAYSUBT>
  - <ACT>
      <TITLE>ACT I</TITLE>
    - <SCENE>
        <TITLE>SCENE I. Alexandria. A room in CLEOPATRA's palace.</TITLE>
        <STAGEDIR>Enter DEMETRIUS and PHILO</STAGEDIR>
      + <SPEECH>
      + <SPEECH>
      + <SPEECH>
      + <SPEECH>
      + <SPEECH>
        <STAGEDIR>Enter an Attendant</STAGEDIR>
      + <SPEECH>
      + <SPEECH>
      - <SPEECH>
          <SPEAKER>CLEOPATRA</SPEAKER>
          <LINE>Nay, hear them, Antony:</LINE>
          <LINE>Fulvia perchance is angry; or, who knows</LINE>
          <LINE>If the scarce-bearded Caesar have not sent</LINE>
          <LINE>His powerful mandate to you, 'Do this, or this;</LINE>
          <LINE>Take in that kingdom, and enfranchise that;</LINE>
          <LINE>Perform 't, or else we damn thee.'</LINE>
        </SPEECH>
      - <SPEECH>
          <SPEAKER>MARK ANTONY</SPEAKER>
          <LINE>How, my love!</LINE>
        </SPEECH>
      + <SPEECH>
```

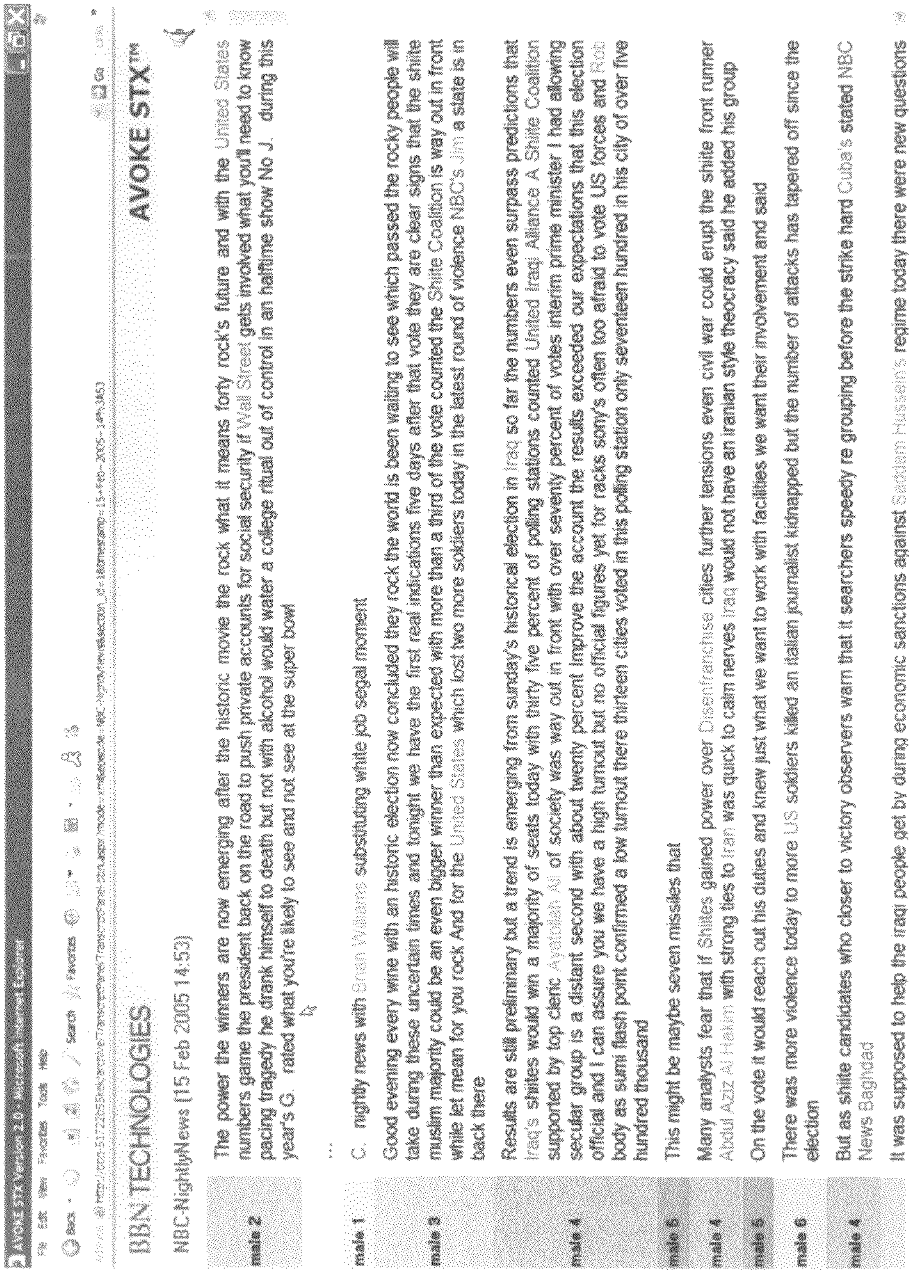

Fig. 7

BBN TECHNOLOGIES

AVOKE STX™

NBC-NightlyNews (15 Feb 2005 14:53)

male 2 — The power the winners are now emerging after the historic movie the rock what it means forty rock's future and with the United States numbers game the president back on the road to push private accounts for social security if Wall Street gets involved what you'll need to know pacing tragedy he drank himself to death but not with alcohol would water a college ritual out of control in an halftime show No J. during this year's G. rated what you're likely to see and not see at the super bowl

...

male 1 — C. nightly news with Brian Williams substituting white job segal moment male 3 — Good evening every wine with an historic election now concluded they rock the world is been waiting to see which passed the rocky people will take during these uncertain times and tonight we have the first real indications five days after that vote they are clear signs that the shiite muslim majority could be an even bigger winner than expected with more than a third of the vote counted the Shiite Coalition is way out in front while let mean for you rock And for the United States which lost two more soldiers today in the latest round of violence NBC's Jim a state is in back there male 4 — Results are still preliminary but a trend is emerging from sunday's historical election in Iraq so far the numbers even surpass predictions that Iraq's shiites would win a majority of seats today with thirty five percent of polling stations counted United Iraqi Alliance A Shiite Coalition supported by top cleric Ayatollah Ali al Hakim of society was way out in front with over seventy percent of votes interim prime minister I had allowing secular group is a distant second with about twenty percent improve the account the results exceeded our expectations that this election official and I can assure you we have a high turnout but no official figures yet for racks sony's often too afraid to vote US forces and Rob body as sunni flash point confirmed a low turnout there thirteen cities voted in this polling station only seventeen hundred in his city of over five hundred thousand male 5 — This might be maybe seven missiles that male 4 — Many analysts fear that if Shiites gained power over Disenfranchise cities further tensions even civil war could erupt the shiite front runner Abdul Aziz Al Hakim with strong ties to Iran was quick to calm nerves Iraq would not have an iranian style theocracy said he added his group male 5 — On the vote it would reach out his duties and knew just what we want to work with facilities we want their involvement and said male 6 — There was more violence today to more US soldiers killed an italian journalist kidnapped but the number of attacks has tapered off since the election male 4 — But as shiite candidates who closer to victory observers warn that it searchers speedy re grouping before the strike hard Cuba's stated NBC News Baghdad It was supposed to help the Iraqi people get by during economic sanctions against Saddam Hussein's regime today there were new questions

Fig. 13
Image
On user interaction
(mouse over image)
Resize image, and
start streaming video
and audio.
Video/audio

INTELLIGENT VIDEO SUMMARIES IN INFORMATION ACCESS

The present invention concerns a method for displaying video data within result presentations in information access systems or information search systems, wherein the method comprises steps for applying a query to a set of videos, identifying matching videos, and producing a result page with at least one of the most relevant videos.

There is known a number of prior art systems which have been designed for compressing, decompressing and playing digital videos on mobile and computer-based systems. In particular, such systems have been designed for viewing video across computer, wireless and mobile networks. These systems are able to compress and stream video content over computer networks, such as the Internet, for decompressing and playing on a computer device such as a PC or mobile phone. Prior art also includes methods for searching video information and based on external metadata, embedded metadata, content based analysis and speech or phonetic transcription of the audio track inside the video. In that connection so-called thumbnails have been used in the prior art. The thumbnails are miniature version of an image or an electronic version of a page that is generally used to allow quick browsing through multiple images or pages. For instance pages on the World Wide Web often comprise thumbnails in form of images. These thumbnails can be loaded much more quickly by the browser than a full-size image. In many cases also these thumbnails can be clicked on by the end user in order to load the complete version of the image. As may be known to skilled persons, the prior art discloses methods for creating thumbnails such as a JPEG of a selected still frame in a video to illustrate the video in a result page of information access solutions.

Given increasing importance of video and moving pictures generally available from content repositories, e.g. in the form of data bases and which is offered to end users via data communication systems such as including extranets or intranets also a growing numbers of information providers on the Internet are offering end users a huge amount of video or digital movie images often on a retail or paper view fee basis, the phenomenon of growth of the amount of information of this kind and its growing importance, particularly in the consumer market for information services, have created a need for more improving an initial result page using thumbnails to facilitate the browsing or a huge actual content.

Hence a primary object of the present invention is to provide a method for constructing an initial result page with thumbnails that are compact and can be downloaded in a very efficient manner.

A second object of the present invention is to provide video and audio analysis tools for ensuring quality and query relevance of the thumbnails.

A third object of the invention is to provide efficient browsing of a video result page by providing on demand and in-context streaming of video summaries.

A fourth object of the invention is to disclose how high-quality and query-dependent video summaries can be computed.

Finally there is final object of the invention to generate video summaries with embedded video advertising.

The above objects as well as further features and advantages are realized according to the present invention with the method which is characterized by steps for pre-computing compressed thumbnails for the videos in the result page, applying one or more pre-computed compressed thumbnails to the result pages, enabling a user or client selection of a video in the result page, and activating streaming of a video summary within the context of an associated result page.

Additional features and advantages will be apparent from the appended dependent claims.

The method according to the present invention shall be better understood from the following detailed description of exemplary embodiments and read in conjunction with the appended drawing figures, of which The patent or application file contains at least one drawing executed in color. Copies of this patent or patent application publication with color drawing(s) will be provided by the office upon request and payment of the necessary fee.

FIG. 1 shows a block diagram for an example search engine architecture,

FIG. 2 how document attributes can be summarized across a result set in various ways.

FIG. 3 a semantic decomposition of text with document properties embedded in the semantic structure, FIG. 4 an example text formatted as XML, FIG. 5 key components in an information access system for video content, FIG. 6 the key components in a speech-to-text system, FIG. 7 an example output from a speech-to-text analysis of the audio track in a video, FIG. 8 how various content sources can be made available for streaming into the context of the result view in the information access, FIG. 9 key building blocks in the construction of intelligent video summaries, FIG. 10 an example of typical web interfaces for search engines providing access to video content, FIG. 11 various options for visualizing a video summary, FIG. 12 a slideshow view of frames in a video summary, FIG. 13 the relationship between compact video thumbnails and streaming of video summaries upon user selection, FIG. 14 another example of typical web interfaces for search engines providing access to video content, FIG. 15 how prior art have selected a single frame 1501 or just a truncated version 1502 of the video for previews, FIG. 16 how key frames and associated time sequences are selected and pieced together to form a video summary together with the audio track, and FIG. 17 how the video thumbnail and the video summary can be captured in a flash encoding and offered as interactive streaming on-demand to the end user.

Now various embodiments of the method according to the present invention shall be disclosed and discussed in some details. These embodiments include client, i.e. end users' access from personal computers, mobile phones, PDAs and game devices. It shall be understood that throughout the invention the term "video", "video data", or "video documents" is used to denote any digital moving picture entity and thus it can be taken to mean a streamed motion picture, a video file, a webinar or live broadcast. Further the term "time sequence" in a video is intended to means consecutive images or frames between a start offset and an end offset in the video.

The method according to the present invention shall be regarded on the background of the present developing technologies for accessing, searching, retrieving and analysing information offered for instance located in document repositories available via data communication networks such as intranets and extranets. For the purpose of accessing, searching, retrieving and analysing information and content repositories such as data bases or websites, search engines are commonly employed to cater for information and search needs that are impossible to satisfy by many of for instance utility programs such as e.g. browsers as used on Internet (the World Wide Web). Hence the architecture of a search engine shall initially briefly be discussed with reference to FIG. 1 which shows the typical key components of a search engine.

In FIG. 1 the search engine is shown comprising various modules 102-108. The search engine can access content repositories 101 where content can either actively be pushed into the search engine or via a data connector be pulled into the search engine. Typical repositories include databases, sources made available via ETL (Extract-Transform-Load) tools such as Informatica, any XML-formatted repository, files from file serves, files from web servers, document management systems, content management systems, email systems, communication systems, collaboration systems, and rich media such as audio, images and video. The documents are submitted to the search engine via a content API (Application Programming Interface) 102. Subsequently, documents are analyzed in a content analysis stage 103 in order to prepare the content for improved search and discovery operations. Typically, the output of this stage is an XML representation of the input document. The output of the content analysis is used to feed the core search engine 104. The core search engine 104 can typically be deployed across a farm of servers in a distributed manner in order to allow for large sets of documents and high query loads to be processed. The core search engine 104 can accept user requests and produce lists of matching documents. The document ordering is usually determined according to a relevance model that measures the likely importance of a given document relative to the query. In addition, the core search engine 104 can produce additional metadata about the result set such as summary information for document attributes. Alternatively, the output of the content analysis stage 103 can be fed into an alert engine 105. The alert engine 105 will have stored a set of queries and can determine which queries that would have accepted the given document input. A search engine can be accessed from many different clients or applications of which are shown mobile and computer-based client applications 109; 110. Other clients include PDAs and game devices. These clients will submit requests to a search engine query API 108. The search engine will typically have means to analyze and refine the query 106 in order to construct a derived query that can extract more meaningful information. Finally, the output from the core search engine 104 is typically further analyzed in a result analysis stage in order to produce information or visualizations that are used by the clients 109 and 110.—Both stages 100 and 107 are connected between the core search engine 104 and in case also the alert engines 105, and the query API 108.

FIG. 2 illustrates how an example information access system computes document summary information. The query is first evaluated and returning a set of N matching documents. The relevance model is then used to rank the documents from most valuable to least valuable relative to the query (D1>D2> . . . DN). Typically, a given number of the highest ranking documents is returned to the client and used to construct a result page. The attributes associated with the documents can be both metadata from the original content repository or metadata that has been discovered inside the content analysis 103. The summary information is either computed based on a certain number of the highest ranking documents or on all N documents that satisfy the query. FIG. 2 illustrates some examples of summary information such as frequency, histograms, and statistical parameters. With video as the content repositories navigation can be applied to embedded structured metadata such as video size, video length, video quality, video format or associated textual metadata such as text and anchor-text on web pages associated with the video. Furthermore, text output from speech-to-text analysis can be used as primary text or input to content refinement that identifies entities used for discovery. Extracted entities from speech-to-text output can be related back to time offsets in the video. Hence, search and navigation can be related back to frames or time sequences inside the original video.

FIG. 3 illustrates contextual document analysis in an example search engine. An input document 301 is decomposed into paragraphs 306, which are further decomposed into sentences 304. Inside the sentences, ranges are marked up as document properties with specific values 302 and 303. The document properties can be recorded in both a full/original form and an associated base form. FIG. 3 illustrates two examples of this. 305 shows an example where a date is both recorded in the original form (March 2002) and a normalized base form (2002-03-XX). The normalized base form simplifies profiling, range searching and robust generation of summary information. Examples of document properties that can be recognized in a similar way include person names, company names, locations, acronyms, dates, file names, URLs, phone numbers, zip codes, email addresses, universities, newspapers, price information, product information, numerical attributes, and stock tickers. The document properties can either be associated with a given location in the document, an interval or a range in the document, a time or time interval in audio and video or a structure in an XML representation of the document. Once again, by deriving a text document from transcription of the audio in the video contextual document refinement can be used to analyze the video sequence and associate various contexts with still frames or time sequences inside the video.

FIG. 4 illustrates a typical XML that be the output of speech-to-text analysis and subsequent structuring. The document is represented in a hierarchical manner, and textual as well as any other type of attributes can be encoded at an arbitrary level. XPath and XQuery are examples of structured query languages that can be used to identify documents and sub-document structures with specific properties. In this example it is for instance possible to look for speeches where the speaker is Cleopatra and there is a line mentioning Caesar. Identified XML fragments will have associated timings and time intervals in the video sequence that were used to extract the underlying text.

FIG. 5 shows some key components of an information access system for video data. A search 501 extracts either complete videos 502 or query sequences from videos. Associated textual and structured metadata can be used to construct navigations means 503. By either selecting specific results 502 or navigating 504 the user can activate playback of the associated video 506.

FIG. 6 illustrates typical components in a speech-to-text system. Audio or the audio track inside a video is analyzed. The output data can in addition to the transcribed text contain metadata such as confidence levels, gender detection, scene changes, speaker changes etc. This output is usually represented as an XML document as described in FIG. 5 that can be further analyzed and refined with textual content refinement methods. Each word, XML tag or attribute will hence have a corresponding time offset in the associated video. Analysis of the produced XML can hence be used as a basis to identify frames or specific time sequences inside the video during both search and navigation operations in the information access system.

Phonetic transcription is an alternative to speech-to-text transcription of the audio track in the video. Phonetic transcription identifies phonemes as opposed to complete text transcriptions. The phoneme sequences are matched with a phonetic representation of the query in order to find locations inside the audio track with the best phonetic similarity. Precision is usually improved in phonetic-based search systems, but less analysis including metadata generation can be performed.

FIG. 8 illustrates how the user of the information access system can interact with streaming services for various content types.

FIG. 9 illustrates key steps in the computation of video summaries. Video summaries may be created as a selection from the original video. In order to do frame-by-frame analysis of the video, the input video must be decompressed and converted into a sequence of individual still frames. Typically each frame is represented as an image with RGB-encoded pixel values during the analytical steps in the computation of the video summary. Each frame also has an associate time delay relative to the beginning of the video and speech transcription can be related back to the same time delays from the beginning of the video. After selection of the appropriate frames for the video summary and potential resizing to client devices, the resulting frames are compressed by encoding with a video codec. Video codecs have adaptable quality/bitrate settings. Hence, by combining codec selection and extraction richness for the video summary one can adapt size and bandwidth requirements for the video summary. Multiple video summaries can either be precomputed or computed on-the-fly to match the bandwidth capabilities of the connection to the client performing the search request. The simplest selection of frames for the video summary is a section from the beginning of the video. Another way is by analyzing the video, and identifying scenes (uninterrupted camera shots), selecting an image to represent each scene. These images may then be displayed as a slideshow to quickly visualize the video content. Alternatively, a number of frames can be selected from each scene and assembled as a video. It can then be displayed as a video of short scene clips, much in the same manner as a movie trailer. These scene clips can either use every frame for a certain time interval in the original video or reduce the video rate in order to save bandwidth during the streaming process. The video codec in the video summary can also be selected independent of the video codec used in the original video. Furthermore, as some videos may have a large number of scenes, a method of selection can be used to extract the most relevant scenes.

Informative scenes can be identified and an image or sequence of images used to represent the scenes by taking recourse to several techniques. To identify scenes it is necessary to look for the interframe changes in the video, where large changes often indicate scene changes. Also, the location within the image where changes occur must be considered, as change in the background is more likely to indicate scene changes. Inter-frame differences can be calculated by looking at colour distribution, texture distribution, and object movement patterns, in addition to spatial information. The motion analysis can also selectively focus on background or foreground objects in order to separate camera-panning operations from object movements inside the scene.

After identifying the scenes in a video, the scenes and images to be used in the video summary have to be selected. By looking at image dynamics, such as the distribution of colours (i.e. how many colours) in the images, as well as texture distribution, one can avoid including images such as one-coloured black or white images, and info/title-frames (i.e. beginning and end of movies), in the video summary. Selection of which scenes to include in the video summary can be done by looking at the length and motion of a scene. To maximize the dynamics and user experience of viewing video summaries, a scene should contain a reasonable degree of motion. Also, the longest scenes are often the most important ones in a video. By combining these two criteria, the scenes can be selected that provide the user with a high quality and quick review of the complete video. In the final video summary, the selected scenes should be organized in the same temporal order as in the original video.

The selected scenes or frame sequences from the video can also be made query specific if an audio track is available. The audio track can in this case be converted to text by speech-to-text analysis and text segments can be identified by correlating the query term to the transcribed text. The identified text segments will correspond to still frames or time sequences inside the video that hence can be selected for inclusion in the video summary. The video summary could contain sufficient video frames around the occurrence of query terms to enable the user to understand the context for the occurrence inside the video.

Video thumbnails can be computed based on the same techniques as discussed above for video summaries. The thumbnails need to be loaded on the result page when the result page is loading initially. Hence, size of video thumbnails will directly impact load time and usability of the information access systems. The video thumbnail will hence typically extract much less data from the video than the video summary. Typically, just a single still frame or a small set of still frames that can be viewed in an animated way—for instance by encoding the selected frames inside an animated GIF file format.

The video thumbnails and video summaries can be constructed device independent or optimized to leverage for instance screen resolution of mobile client devices. Different devices such as e.g. personal computers, pocket PCs and mobile phones have different capabilities with regard to processing, storage, display, and network bandwidth. Different device-customized media content can be generated, as well as in real-time convert media content to meet the requirements of specific devices.

The present invention can be presented as an application such as in a PC or mobile hyperlink browser, such as for the World Wide Web. The presentation of video documents can become active when selecting the video by starting to stream i.e. audio, video, image slideshows, video summaries, or a combination of the afore-mentioned media types. This content may be represented as a sequence of different media, which are streamed upon need. This will remove unnecessary bandwidth load from inactive applications. Activation of a video item may also trigger effects to emphasize the selection. Such visual effects include, but are not limited to, changes video/image colours, video frame rate, audio volume, tint factor, and image/video display size. The user activation of a specific video result can for instance be done by hoovering, mouse over, scrolling or clicking on a video in the result set. Many technologies are available to support the actual streaming of the computed video summaries. One example is flash with embedded video in a codec such as MPEG4 that is appropriate to minimize necessary bandwidth and still maintain good viewing quality. The playback can also be done at a different speed than the original video. A slow motion display of the video thumbnails is one option. After streaming, the client can catch the streamed video summary such that repeated playbacks can be achieved without initiating additional streaming operations. The combination of minimally sized video thumbnails and high-quality video summaries streamed in context and upon request provides a very efficient environment for quickly exploring video content. Result pages will load very quickly due to the small size of the initially downloaded video thumbnail. Quick download time improves efficiency and user satisfaction of information access systems. At the same time, the user can explore the real content of the videos by streaming video summaries. Playback of video summaries are hence initiated immediately after selection by the user and the user can at any time change focus to a different video and switch the streaming process to a different source. The combination of smart bandwidth usage and live streaming also makes the present invention a very attractive approach to browsing video content from mobile devices such as cell phones, PDAs or game devices. From mobile devices a result page might be constructed as a scrollable sequence of full size video thumbnails/video summaries in order to leverage the screen size for viewing in the best possible way.

Advertisement media can be added to video summaries. This advertisement may be implemented as image frames or video sequences that cannot be skipped, before, during or after the requested media. The selected advertisements can either be pre-selected and embedded in the video summaries or dynamically integrated in the video summaries during the streaming process. By dynamically integrating advertisement media the advertisements can be selected at query time and hence follow existing models for search-based advertising such as the sponsored listings programs offered by web search providers (for instance Google and Yahoo). In addition to insertion of advertising media objects in the video summary actionable advertising elements can be inserted. Examples of actionable advertising elements include:

- HTML fragments with hyperlinks that can be accessed within the streamed view of the video summary. Hence, sponsored links as they are appearing in web search engines can be directly embedded in the video summary and enable user activation to jump to the related sponsor page.
- Actionable widgets such as buttons, links inside for instance flash that can be activated at any time by the user during viewing/streaming of the video summary.
- Display of candidate multimedia made available such that the user both gets an offer to buy and can perform the buying transaction while viewing a video summary. Multimedia examples include song or video versions of the video corresponding to the viewed video summary and related songs, videos that might be interesting based on the selection of the video summary.

In order to provide at a glance exemplification of results achievable with the method of the present invention when applied to the computation intelligent video thumbnails with rapid review and browsing capabilities within a search engine result presentation. The following figures are largely self-explanatory and hence no detailed discussion thereof will be given.

Figure 1:
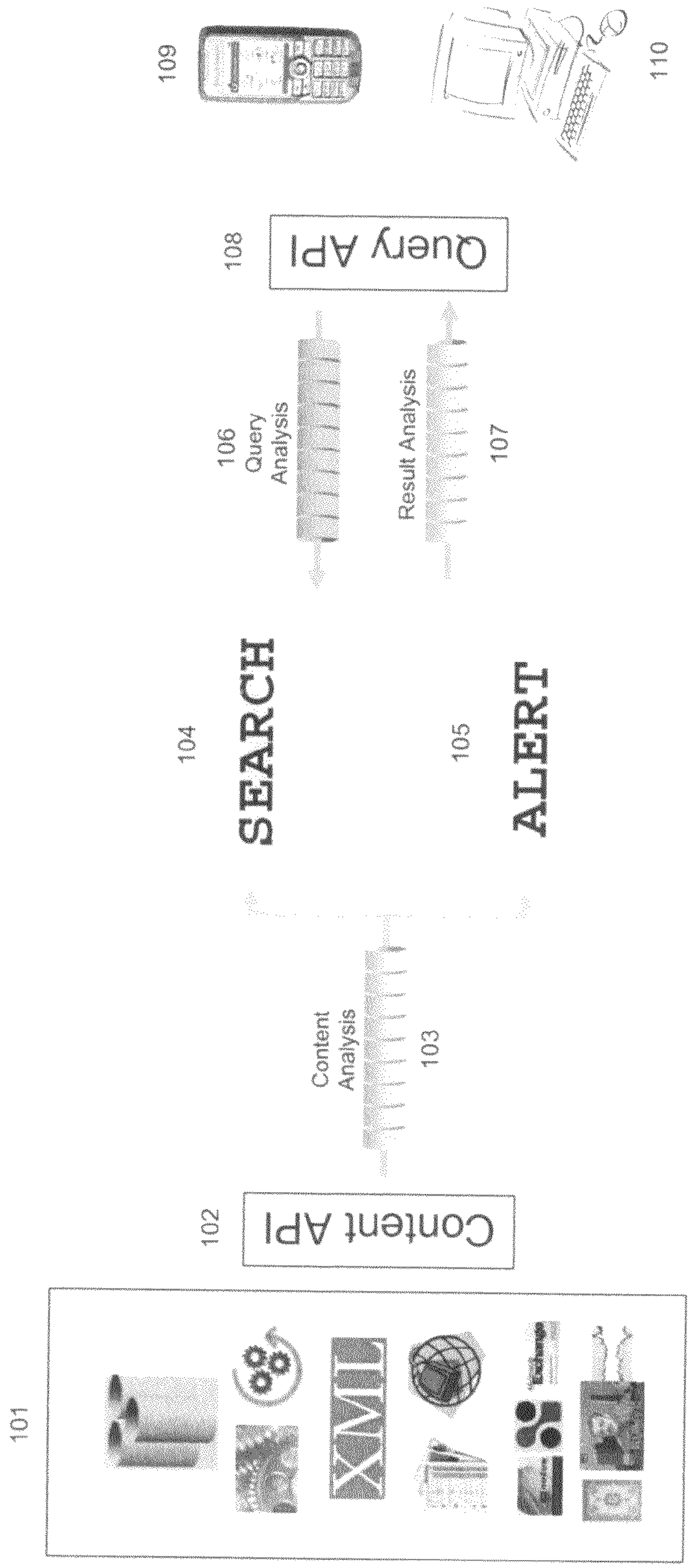
Figure 2:
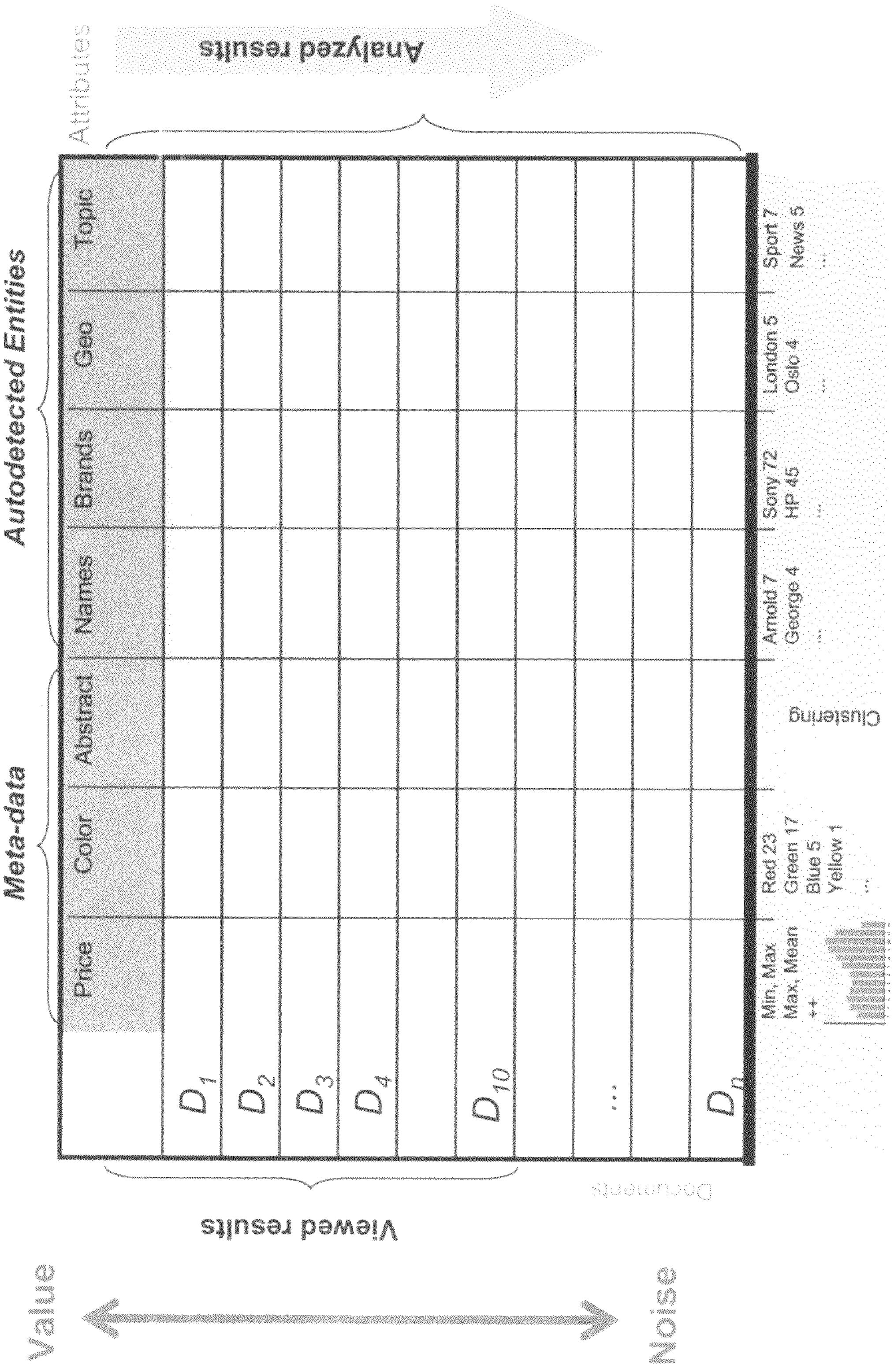
Figure 3:
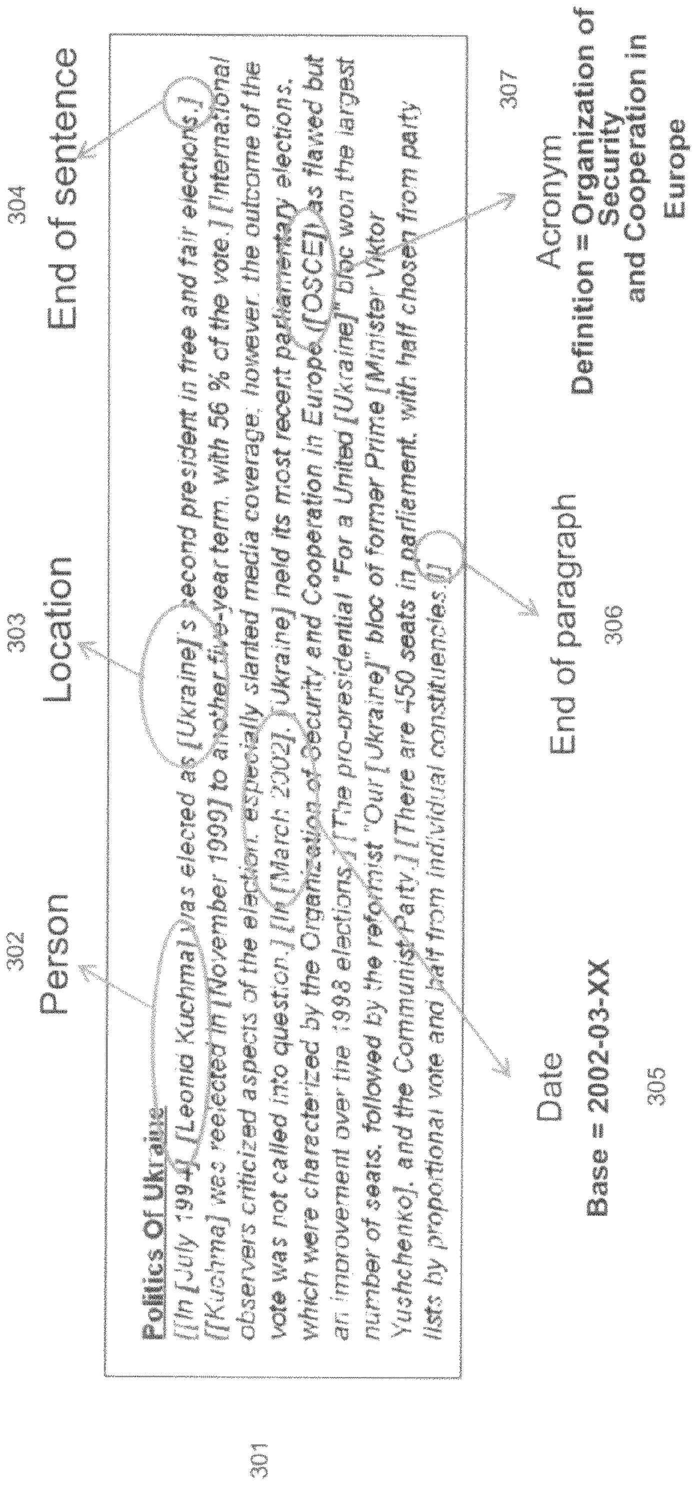
Figure 5:
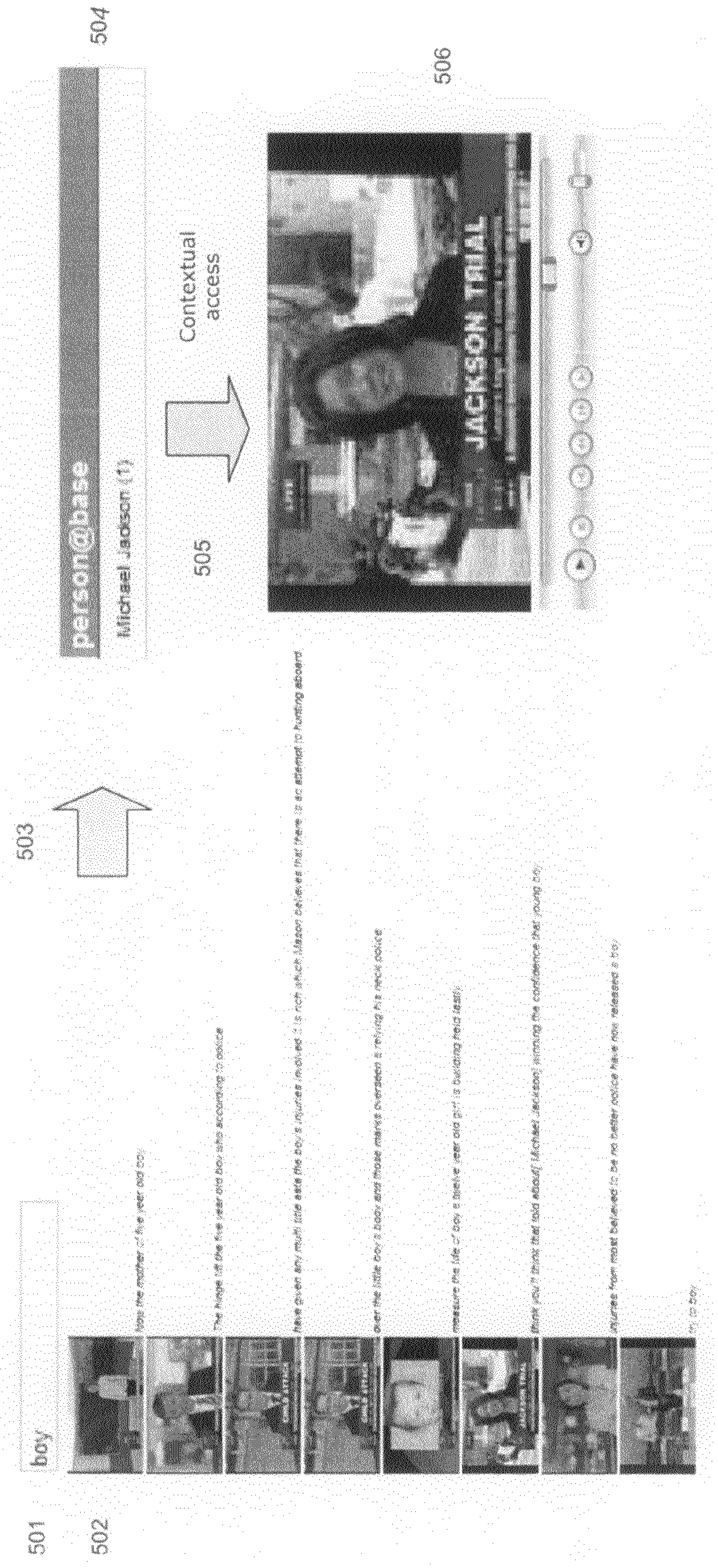
Figure 6:
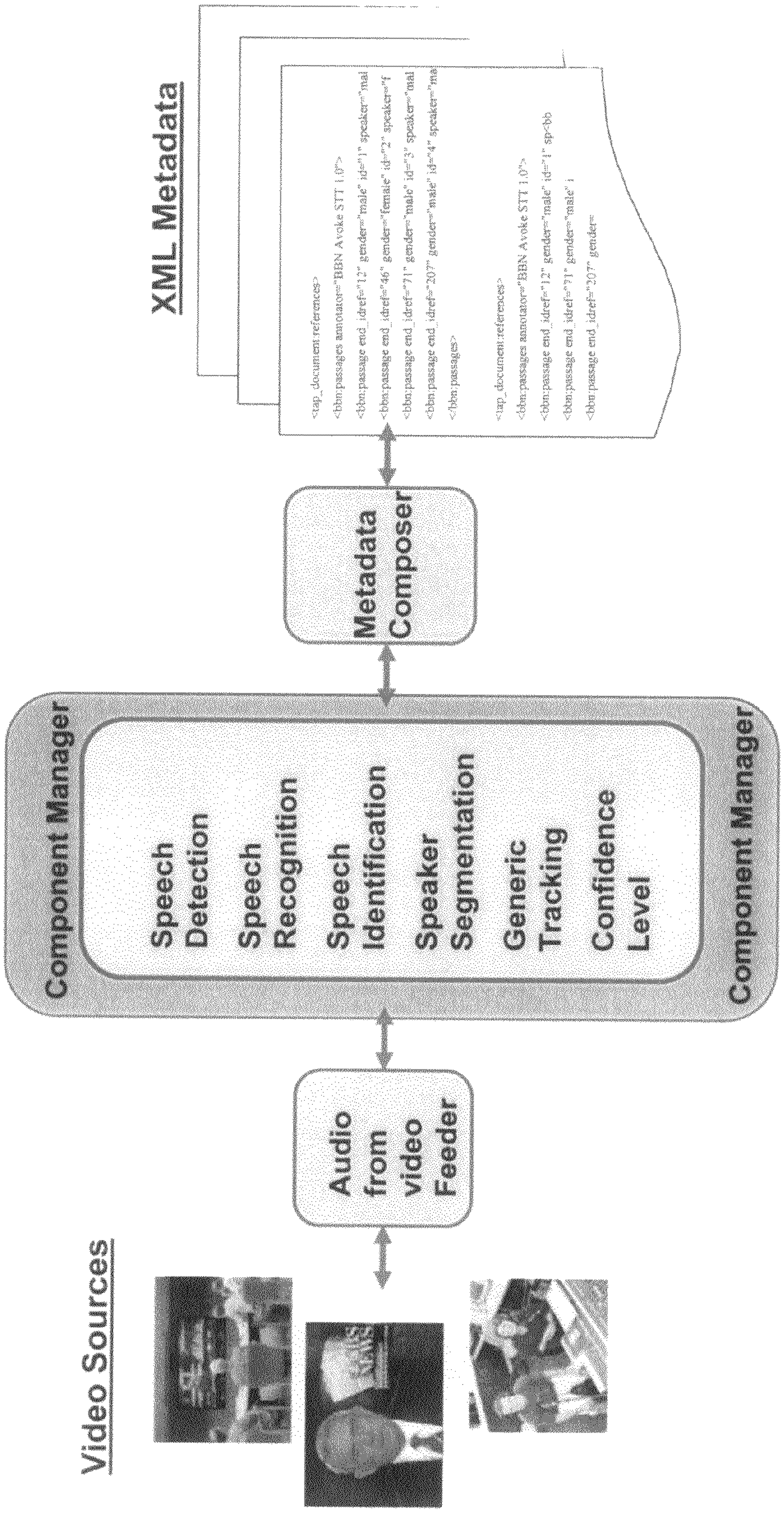
Figure 8:
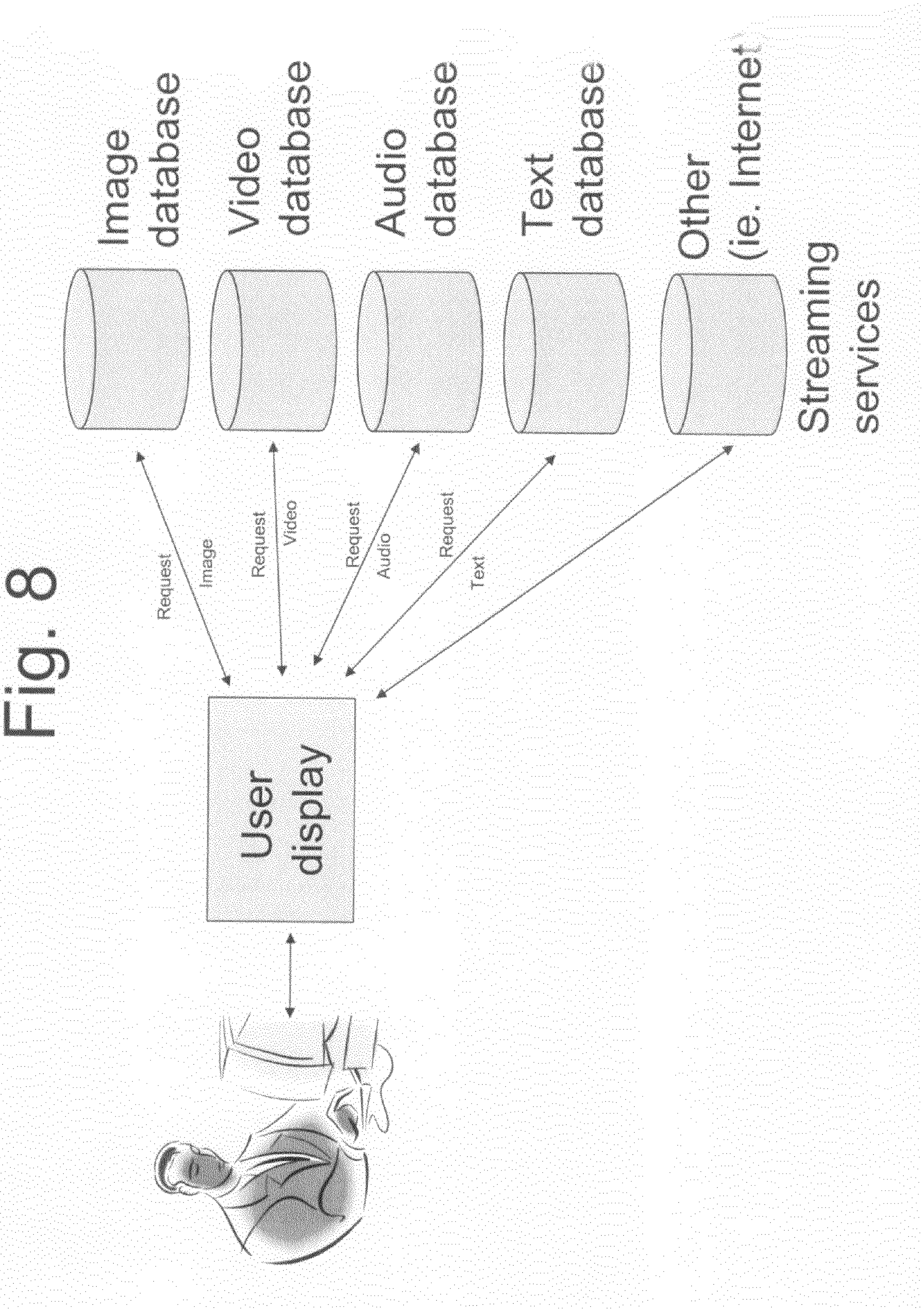
Figure 9:
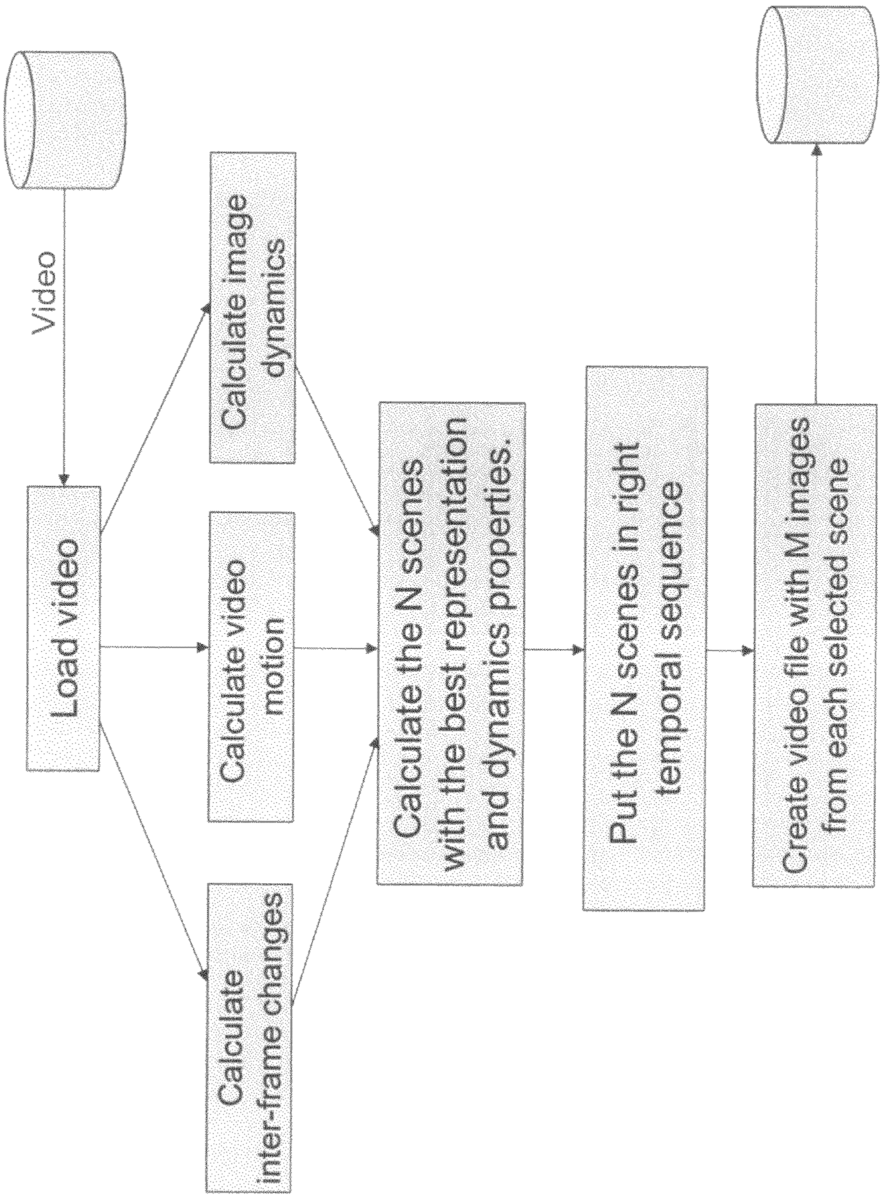
Figure 10:
FIGS. 10 and 14 illustrate examples of typical prior art web interfaces for search engines providing access to video content.
Figure 11:
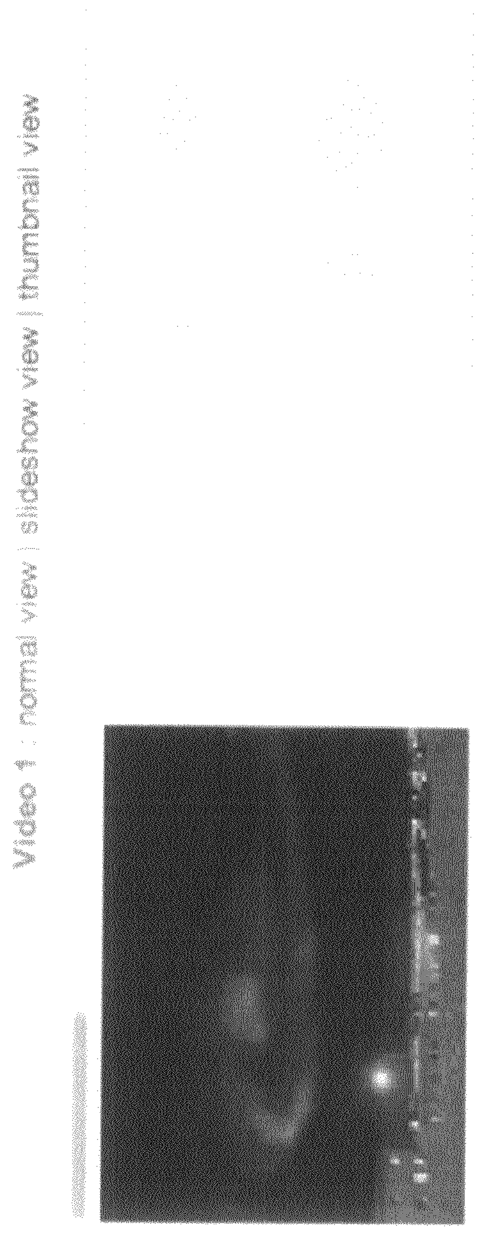
FIG. 11 illustrates various prior art options, for visualizing a video summary.
Figure 12:
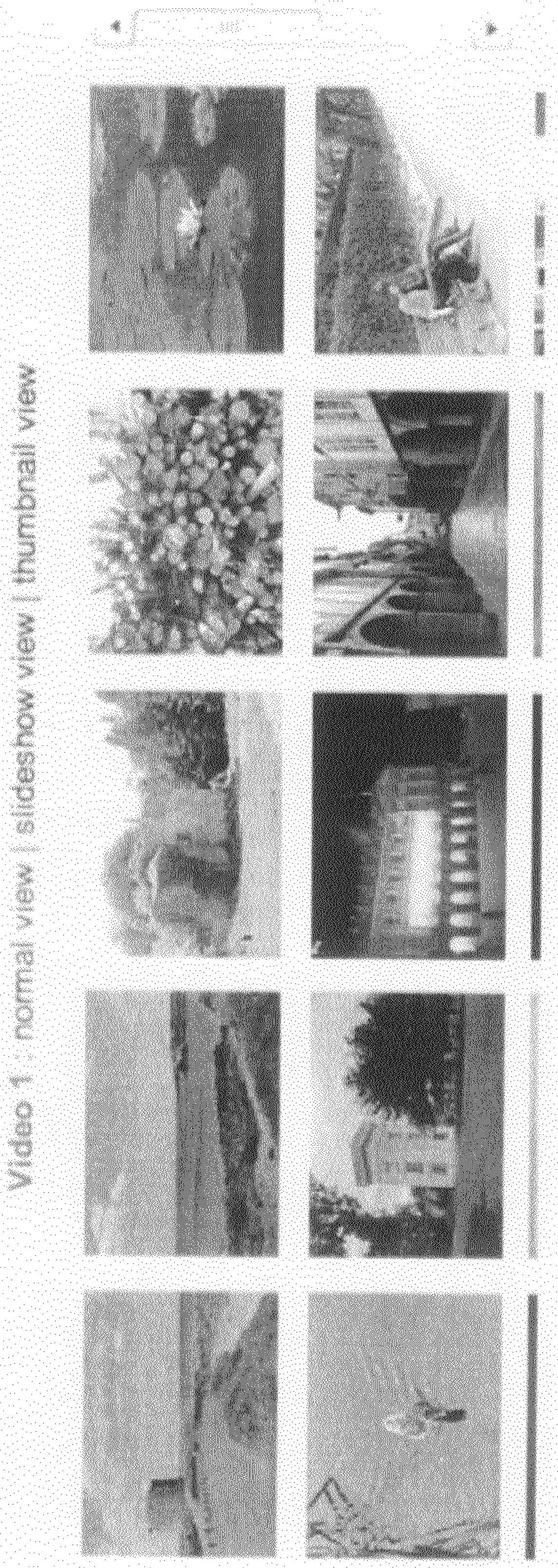
FIG. 12 illustrates a prior art slideshow view of frames in a video summary.
Figure 13:
FIG. 13 illustrates the relationship between compact video thumbnails and streaming of video summaries upon user selection as shall be possible with the present invention.
Figure 14:
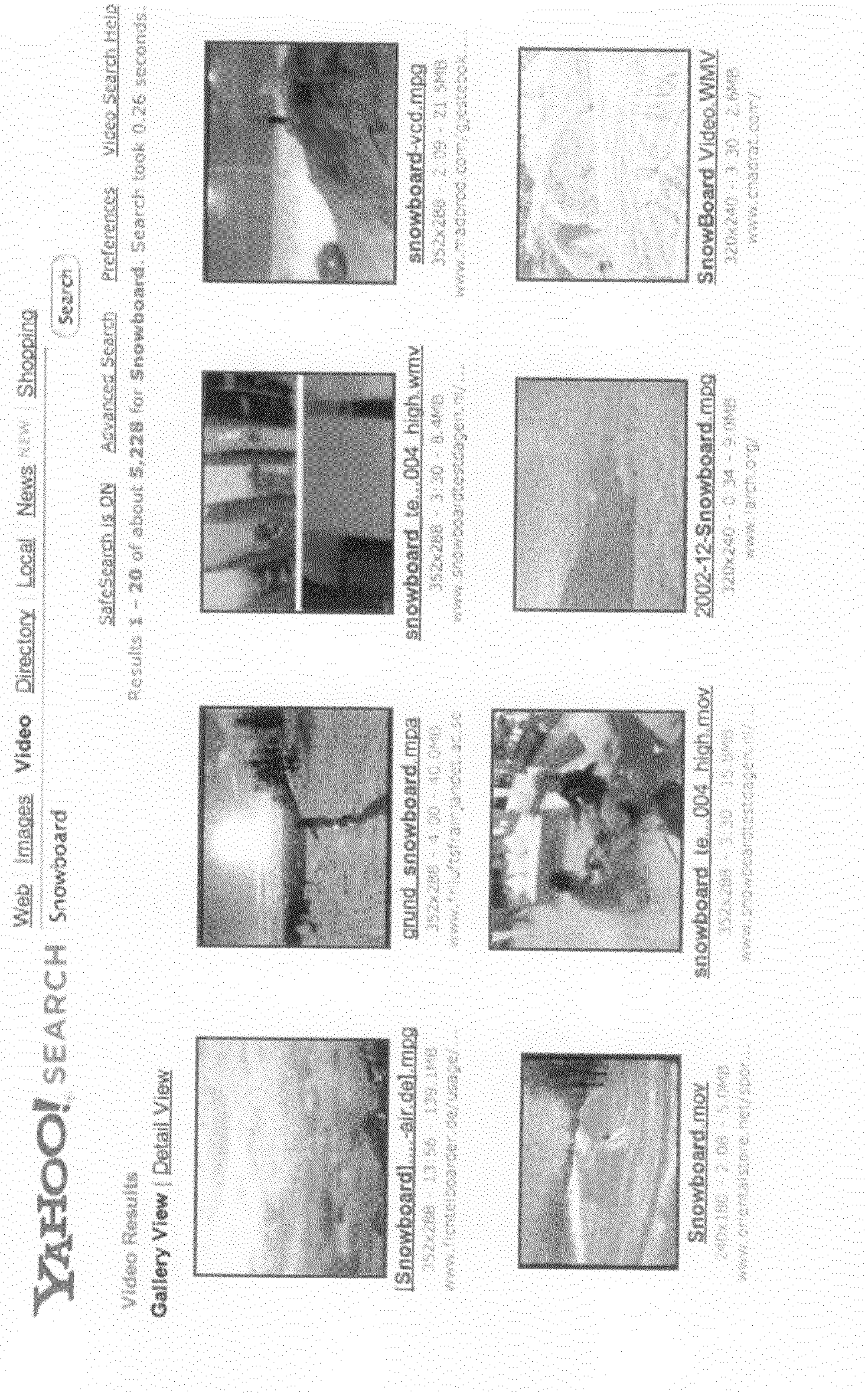
Figure 15:
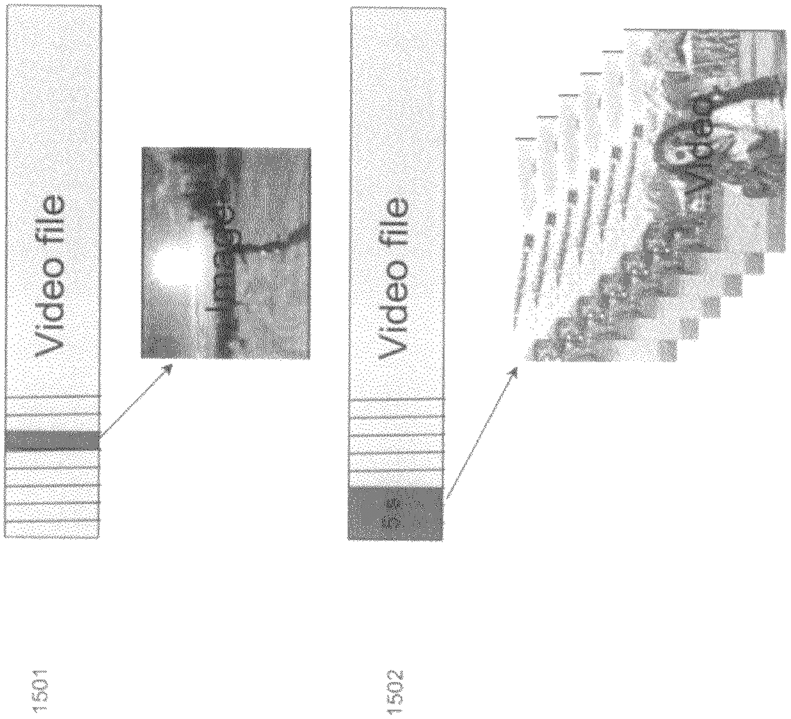
FIG. 15 illustrates how prior art have selected a single frame 1501 or just a truncated version 1502 of the video for previews.
Figure 16:
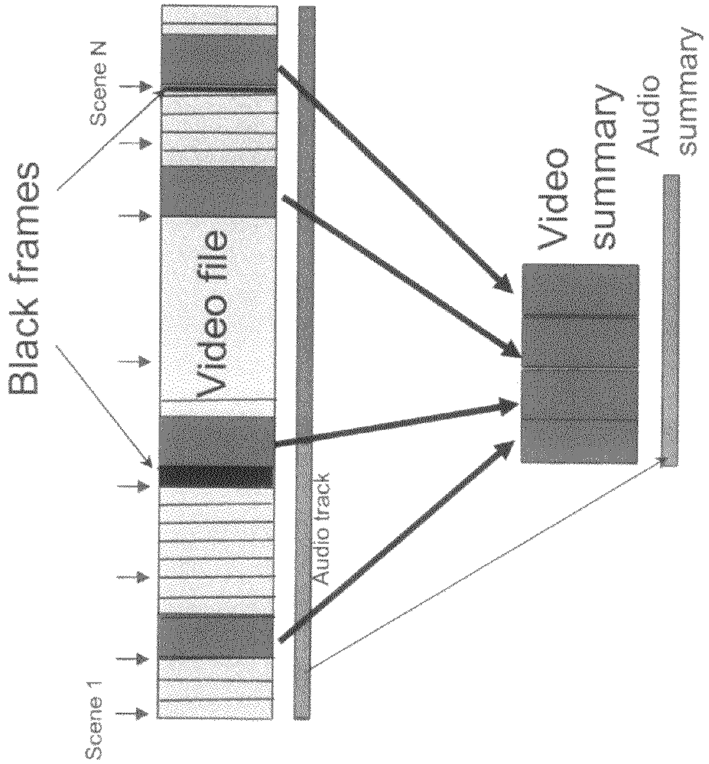
FIG. 16 illustrates how key frames and associated time sequences are selected and pieced together to form a video summary together with the audio track, as shall be possible with the present invention.
Figure 17:
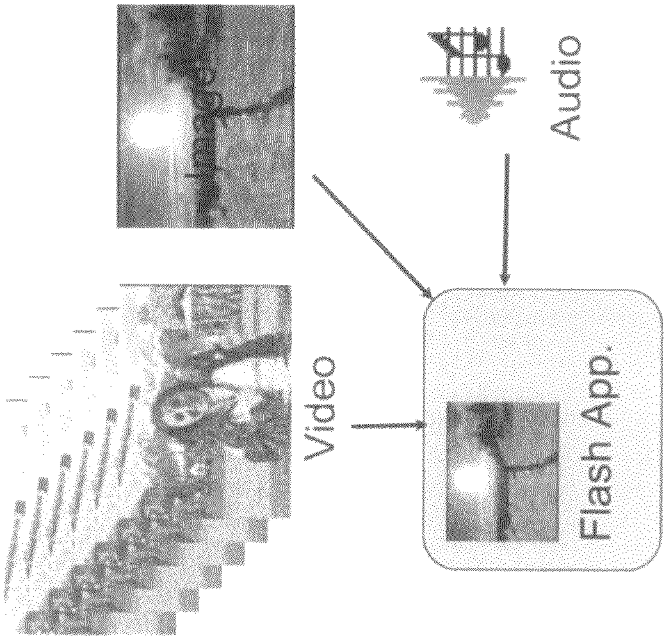
FIG. 17 illustrates how the video thumbnail and the video summary can be captured in a flash encoding and offered as interactive streaming on-demand to the end user as shall be possible with the present invention.

From the foregoing it will be apparent to a person skilled in the art that the present invention greatly enhances the possibilities of displaying and visualizing video data within result presentations in information access and search systems.

It is obviously apparent that dynamic representation of video content in addition to textual descriptions can provide more informative query results to the end user. Such representation may include video summary/video thumbnail, image slideshows, audio image selection or any combinations thereof, but need by no means be limited thereto.

While the present invention has been described with reference to certain embodiments, it will be understood by those skilled in the art that various changes may be made and equivalents may be substituted without departing from the scope thereto. In addition, many modifications may be made to adapt a particular situation or material to the teachings of the present invention without departing from its scope. Therefore, it is intended that the present invention shall not be limited to the particular embodiment disclosed, but will include all embodiments falling within the scope of the herewith appended claims.

The invention claimed is:

1. A method for displaying video data within result presentations in information access systems or information search systems, wherein the method comprises:

applying a query to a set of videos;

identifying matching videos in the set of videos;

producing a result page with at least one of the matching videos;

pre-computing compressed thumbnails for the matching videos;

applying one or more of the pre-computed compressed thumbnails to the result page;

enabling a user selection of a video in the result page;

generating a video summary that provides to an end user an abbreviated review of a complete video, the video summary comprising a plurality of frames from the complete video including frames near the beginning of the video and frames near the end of the video but not all of the frames from the complete video, the complete video being one of the matching videos, wherein generating the video summary comprises:

identifying, in the video, a frame sequence whose corresponding audio track contains a query term in the query; and including the frame sequence in the video summary; and activating, by a server, streaming of the video summary displayed within the context of the result page in response to the user selection of the video.

2. A method according to claim 1, wherein the set of videos contains at least one of: video files, webinars, streaming video sources or live video broadcasts.

3. A method according to claim 1, further comprising matching the query based on one of: textual metadata associated with the video, structured metadata associated with the video, text extracted from an audio track by speech-to-text analysis, or phonetic transcription extracted from the audio track; or combinations thereof, the structured metadata associated with the video including at least one of: video size, video length, video quality or video format.

4. A method according to claim 1, further comprising optimizing the pre-computed compressed thumbnails to display capabilities of a client device used to view the result page.

5. A method according to claim 1, further comprising using at least one still frame from a given one of the matching videos in the pre-computed compressed thumbnail for the given one of the matching videos.

6. A method according to claim 5, further comprising selecting the at least one still frame in response to occurrence of query terms inside an audio track of the given one of the videos, the query terms being terms in the query.

7. A method according to claim 1, wherein the end user selects the video by either hovering, mousing over, scrolling, or clicking on the video in the result page.

8. A method according to claim 1, wherein the result page is a web page viewed inside a browser.

9. A method according to claim 1, wherein activating streaming of the video summary comprises streaming the video summary to a client device, the client device being a wireless mobile device.

10. A method according to claim 9, further comprising presenting the result page by scrolling through the videos in the result page individually in full screen mode.

11. A method according to claim 1, further comprising optimizing the video summary to a display capability of a client device used to view the result page.

12. A method according to claim 1, further comprising constructing the video summary by combining multiple time sequences from the video.

13. A method according to claim 12, further comprising selecting the time sequences in response to scene changes in the video, motion analysis in the video, or audio analysis of the video; or combinations thereof, the query terms being terms in the query.

14. A method according to claim 12, further comprising constructing an audio track of the video summary by combining audio tracks associated with the time sequences.

15. A method according to claim 1, wherein activating streaming of the video summary comprises activating streaming of the video summary to a client device that caches video summaries after streaming, such that subsequent replays do not require additional streaming of video data.

16. A method according to claim 1, further comprising encoding the video summary with flash technology.

17. A method according to claim 1, wherein playback of the video summary is in slow motion.

18. A method according to claim 1, wherein activating streaming of the video summary comprises: activating streaming of the video summary to a client device; and wherein the method further comprises: constructing the video summary adaptively such that streaming requirements match capabilities of a transfer link to the client device.

19. A method according to claim 1, further comprising integrating advertising information inside the video summary.

20. A method according to claim 19, further comprising integrating the advertising information by mixing advertising video sequences with selected sequences from the video.

21. A method according to claim 20, further comprising including in the video summary one of: sponsored links from paid web search engines and which can be activated by the end user during viewing/streaming of the video summary, actionable widgets inside a view of the video summary that enable actions relating the end user to an advertiser, or display and means for the end user to buy a multimedia object such as a song or a video; or combinations thereof.

22. A method for displaying video data within a result page, the method comprising:

receiving a query from a client device;

applying the query to a set of videos containing at least one of: video files, webinars, streaming video sources and live video broadcasts;

identifying matching videos in the set of videos based on at least one of:

textual metadata associated with the videos, and structured metadata associated with the videos, the structured metadata including at least one of: video size, video length, video quality or video format, text extracted from an audio track by speech-to-text analysis, or phonetic transcription extracted from the audio track;

producing a result page with at least one of the matching videos, wherein the result page is a web page viewed inside a browser;

pre-computing compressed thumbnails for the matching videos using at least one still frame from each of the matching videos in the pre-computed compressed thumbnails for the matching videos, wherein the at least one still frame for each of the matching videos is selected in response to occurrences of query terms inside audio tracks of the matching videos;

optimizing the pre-computed compressed thumbnails to display capabilities of the client device;

applying one or more of the pre-computed compressed thumbnails to the result page;

enabling a user selection of a video in the result page, said user selecting the video by either hovering, mousing over, scrolling or clicking on the video in the result page;

selecting at least one time sequence in the video in response to one of: occurrences of query terms inside an audio track of the video, scene changes in the video, motion analysis in the video, or audio analysis of the video, or combinations thereof;

constructing a video summary by combining the at least one time sequence from an original video of the result page, wherein the video summary is constructed adaptively such that streaming requirements of the video summary match capabilities of a transfer link to the client device;

constructing an audio track of the video summary by combining audio tracks associated with the at least one time sequence;

optimizing the video summary to the display capabilities of the client device;

encoding the video summary with flash technology;

integrating advertising information inside the video summary by mixing advertising video sequences with selected sequences from the video; and activating, by a server, streaming of the video summary to the client device such that the client device displays the video summary within the context of the result page, wherein playback of the video summary is in slow motion.

* * * * *